United States Patent
Sarachik et al.

(10) Patent No.: US 6,324,299 B1
(45) Date of Patent: Nov. 27, 2001

(54) OBJECT IMAGE SEARCH USING SUB-MODELS

(75) Inventors: Karen B. Sarachik; Ivan A. Bachelder, both of Newton; Cyril C. Marrion, Acton; Yian Leng Chang, Sudbury, all of MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/054,968

(22) Filed: Apr. 3, 1998

(51) Int. Cl.[7] .............................. G06K 9/00; G06K 9/36; G06K 9/62; H04N 5/125; H04N 1/04
(52) U.S. Cl. ..................... 382/151; 382/103; 382/216; 382/287; 382/289; 382/291; 348/169; 358/488
(58) Field of Search ...................................... 382/151, 154, 382/103, 181, 209, 219, 291, 177, 203, 216, 287, 289, 296; 348/169; 358/488

(56) References Cited

U.S. PATENT DOCUMENTS

| | | | |
|---|---|---|---|
| 4,731,860 | * 3/1988 | Wahl | 382/281 |
| 4,980,971 | 1/1991 | Bartschat et al. | 29/833 |
| 5,060,276 | * 10/1991 | Morris et al. | 382/151 |
| 5,113,565 | 5/1992 | Cipolla et al. | 29/25.01 |
| 5,226,095 | * 7/1993 | Okumura et al. | 382/151 |
| 5,268,999 | 12/1993 | Yokoyama | 345/441 |
| 5,343,028 | 8/1994 | Figarella et al. | 235/462.09 |
| 5,371,690 | 12/1994 | Engel et al. | 382/151 |
| 5,471,541 | * 11/1995 | Burtnyk et al. | 382/153 |
| 5,495,537 | 2/1996 | Bedrosian et al. | 382/209 |
| 5,497,451 | 3/1996 | Holmes | 345/420 |
| 5,500,906 | 3/1996 | Picard et al. | 382/220 |
| 5,545,887 | 8/1996 | Smith et al. | 235/462.08 |
| 5,602,937 | * 2/1997 | Bedrosian et al. | 382/151 |
| 5,621,807 | * 4/1997 | Eibert et al. | 382/103 |
| 5,625,715 | * 4/1997 | Trew et al. | 382/209 |
| 5,627,912 | 5/1997 | Matsumoto | 382/146 |
| 5,627,915 | * 5/1997 | Rosser et al. | 382/219 |

(List continued on next page.)

OTHER PUBLICATIONS

Newmann, et al "3D CAD–Baed Inspection I: Coarse Verification", IEEE, pp. 49–52, 1992.*

(List continued on next page.)

Primary Examiner—Leo Boudreau
Assistant Examiner—Daniel G. Mariam
(74) Attorney, Agent, or Firm—Russ Weinzimmer (57) ABSTRACT

The invention provides a method of locating an object within a client region, where the object has a plurality of portions. The method includes defining a full geometric model of the object; defining a plurality of geometric sub-models of the object; determining coarse candidate poses of the object within the region using an image of the region and the full geometric model of the object; determining the fine pose of each of a plurality of portions of the object using the coarse candidate poses of the object within the region, and at least some of said geometric sub-models, to provide a plurality of object portion fine poses within the region; and then determining the fine poses of the object within the region using said plurality of object portion fine poses of a plurality of portions of the object includes determining the coarse poses of each of a plurality of portions of the object, and using each coarse pose, determining the fine pose of each of the plurality of portions of the object. The invention allows geometric descriptions of objects (such as resistor chips, ball grid array packages, flip chips, etc.) to be specified in an arbitrary coordinate system, such as a physical (real world) coordinate system. This allows the same model to be used when locating the object within the physical world over a wide range of imaging conditions. The invention provides a powerful method for finding objects in images that is efficient in both memory space and computational time.

9 Claims, 5 Drawing Sheets

U.S. PATENT DOCUMENTS

| | | | |
|---|---|---|---|
| 5,663,809 | | 9/1997 | Miyaza et al. ......................... 358/450 |
| 5,828,769 | * | 10/1998 | Burns .................................... 382/118 |
| 5,845,288 | * | 12/1998 | Syeda-Mahmood ................. 707/102 |
| 5,850,469 | * | 12/1998 | Martin et al. ......................... 382/154 |
| 5,963,664 | * | 10/1999 | Kumar et al. ......................... 382/154 |
| 5,974,169 | | 10/1999 | Bachelder ............................ 382/151 |
| 6,037,949 | * | 3/2000 | DeRose ................................ 345/430 |

OTHER PUBLICATIONS

Hoogs, et al "Model–Based Learning of Segmentations", IEEE, pp. 494–499, 1996.*

Ullman, Shimon, "Aligning pictorial descriptions: An approach to object recognition, I: Approaches to Object Recognition," reprinted from *Cognition*, Aug. 1989, pp. 201–214, vol. 32, No. 3, Cambridge, MA, USA.

Cognex Corporation, "Chapter 5 Fiducial Finder," *Cognex 4000/5000 SMD Placement Guidance Package User's Manual*, 1996, pp. 179–223, Release 3.2 590–0139, Natick, MA, USA.

Cognex Corporation, "Chapter 7 Rectilinear Device Inspection," *Cognex 4000/5000 SMD Placement Guidance Package User's Manual*, 1996, pp. 269–310, Release 3.2 590–0139, Natick, MA, USA.

Medina–Mora, Raul, "An Incremental Programming Environment," *IEEE Transactions on Software Engineering*, Sep. 1981, pp. 472–482, vol. SE–7, No. 5, USA.

* cited by examiner

Sub-model table

| label | pose of sub-model coordinate frame in full model reference frame | storage |
|---|---|---|
| 0 | trans = (-w,-w), angle = 180 | |
| 1 | trans = (+w,-w), angle = 270 | |
| 7 | trans = (+w/2,+w/2), angle = 0 | |
| 8 | trans = (-w/2,+w/2), angle = 90 | |
| 5 | trans = (-w/2,-w/2), angle = 180 | |
| 6 | trans = (+w/2,-w/2), angle = 270 | |
| 4 | trans = (-w,+w), angle = 90 | |
| 2 | trans = (+w,+w), angle = -60 | |
| 3 | trans = (0,+w/3), angle = 60 | |

Model Storage:

Normalized Models | Image search models

Cognex Patquick Model

Cognex Patmax Model

Cognex Patmax Model

Cognex Patmax Model

Cognex Patmax Model

Cognex Patmax Model

Sub-model table

| label | pose of sub-model coordinate frame in full model reference frame | storage |
|---|---|---|
| 0 | trans = (0,0), angle = 0 | |
| 1 | trans = (0,0), angle = 0 | |
| 2 | trans = (+w/2,+w/2), angle = 0 | |
| 3 | trans = (-w/2,+w/2), angle = 90 | |
| 4 | trans = (-w/2,-w/2), angle = 180 | |
| 5 | trans = (+w/2,-w/2), angle = 270 | |

FIG. 5B

OBJECT IMAGE SEARCH USING SUB-MODELS

FIELD OF THE INVENTION

This invention relates to searching for an image of an object within an image of a region that may contain the object.

BACKGROUND OF THE INVENTION

In the field of searching for an image of an object in an image that may contain the image of the object, it is known to use a model to search for the object image by using Normalized Correlation Search, Generalized Hough Transforms, or PatMax, sold by Cognex Corporation, Natick Mass, for example. A model is defined herein as a set of acceptable spatial arrangements of features of an object. Examples of models include: geometric models, wire frame models, CAD models, an image of a typical object, an image of an ideal object, an image of a sought object, an edge-detected image of an object, and a Generalized Hough Transformed image of an object. However, when the relationship between the image of the object and the model of the object is described by a non-linear transformation, search speed and robustness may be reduced.

When searching for an image of an object, it is known to use sub-models to accommodate non-linear transformations between the image of the object and the model of the object. A sub-model of an object is a model of a portion of the object. For example, it is known in the art to define a plurality of sub-models (also referred to as "parts") of an object to be found, and then use the plurality of sub-models to find images of portions of the object. In this case, the entire image is searched for images of the portions using each sub-model. Then, the found poses of the sub-models are fit to the corresponding poses of the sub-models in the model of the entire object. (A pose is a generalized position, including location, orientation, scaling, skew, etc.) To accomplish this fit operation, the sub-models must be mutually distinguishable, thereby providing correspondence. Alternatively, the correct correspondence between the sub-models in the image of the entire object and the sub-models in the model must be determined via combinatorial search and verification techniques.

In the above known techniques for searching using sub-models, the specification of the model of the object is made by first defining the individual sub-models of the object, and then defining the model of the object as a spatial arrangement of the sub-models. However, once the model is created in this fashion, changing the model definition or its sub-model definition requires a completely new definition of this spatial arrangement, which can be problematic. Moreover, it is not easy to automatically extract optimized sub-models of the object and to automatically extract the pose of each sub-model within the model. Consequently, the user typically must define the sub-models that are used to locate the image of the object.

SUMMARY OF THE INVENTION

The invention provides a method of locating an object within a client region, where the object has a plurality of portions. The method includes defining a full geometric model of the object; defining a plurality of geometric sub-models of the object; determining coarse candidate poses of the object within the region using an image of the region and the full geometric model of the object; determining the fine pose of each of a plurality of portions of the object using the coarse candidate poses of the object within the region, and at least some of said geometric sub-models, to provide a plurality of object portion fine poses within the region; and then determining the fine poses of the object within the region using said plurality of object portion fine poses.

In a preferred embodiment, defining a plurality of sub-models of the object includes defining the pose of each sub-model within the reference frame of the full model. In a further preferred embodiment, determining the fine pose of each of a plurality of portions of the object includes determining the coarse poses of each of a plurality of portions of the object, and using each coarse pose, determining the fine pose of each of the plurality of portions of the object.

Further, determining the fine pose of each of a plurality of portions of the object occurs locally and independently for each portion of the object.

In another preferred embodiment of the invention, using a full geometric model of the object to determine the coarse candidate poses of the object includes creating an image search model in an image frame of reference. Moreover, creating an image search model in an image frame of reference can include creating a template matching model of the object. In particular, creating an image search model in an image frame of reference can include creating a normalized correlation search model of the object. Also, creating an image search model in an image frame of reference can include creating a generalized Hough transform model of the object.

In a further preferred embodiment, using a geometric sub-model to determine the fine pose of a portion of the object includes creating an image search model in an image frame of reference for that sub-model.

The invention provides a general purpose, user-configurable shape finding method for many machine vision applications where object are to be found using images such as in the inspection of surface mounted devices and fiducial marks.

The invention builds on the strengths of image-based search tools, such as PatMax and PatQuick, sold by Cognex Corporation, by adding the ability to deal with moderate deformations in objects.

The invention allows a client to choose a sub-model strategy that works best for a particular set of object characteristics and imaging conditions.

The invention allows geometric descriptions of objects (such as resistor chips, ball grid array packages, flip chips, etc.) to be specified in an arbitrary coordinate system, such as a physical (real world) coordinate system. This allows the same model to be used when locating the object within the physical world over a wide range of imaging conditions.

The invention provides a powerful method for finding objects in images that is efficient in both memory space and computational time.

The invention avoids the need for users to deal explicitly with lower-level, more complicated vision tools.

The invention provides an automatic method for specifying sub-models, thereby allowing users that are not highly skilled in the art of machine vision to rapidly create effective object inspection systems.

BRIEF DESCRIPTION OF THE DRAWING

The invention will be more fully understood from the following detailed description, in conjuction with the accompanying figures, wherein.

DETAILED DESCRIPTION OF THE PREFERRED EMBODIMENTS

Figure 1:
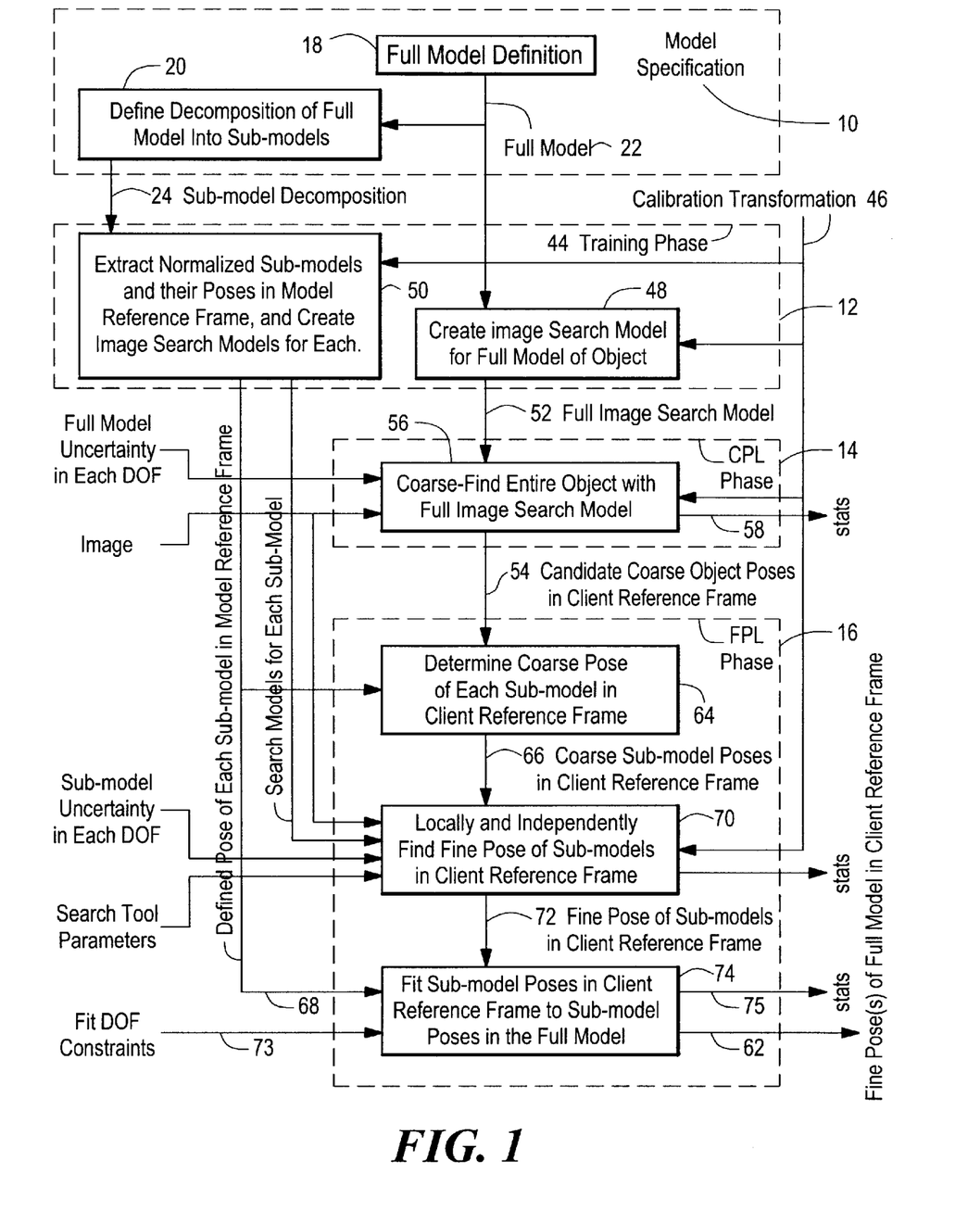
FIG. 1 is a flowchart of a preferred embodiment of the invention.

With reference to FIG. 1, the method of the invention can be partitioned into four main phases: model specification 10, training 12, CPL (coarse part location) 14, and FPL (fine part location) 16. Note, however, that the invention does not preclude the insertion of additional processing steps between phases, or steps within phases, nor does it require performing all four phases at once.

Model Specification Phase 10: In this phase, the client (a human operator, or a computer program) specifies the full model of the object 18 and the portions of the full model which constitute the sub-models 20. This phase 10 is performed once and then usually needs to be performed only when the desired full model 22 or sub-model specification 24 changes. Full Model Definition 18: The client must provide a full geometric description of the object. For example, the client might specify a set of disconnected curvilinear shapes, each consisting of a sequence of vertices. Successive vertices within a curvilinear shape may be connected by segments. Each segment may consist of a line segment or an arc segment with any radius of curvature The full model 26 shown in FIG. 3, consisting of a set of polygons 28 and 30, is an example of this type of full model definition. Optionally, the first and last vertices in each curvilinear shape may also be connected by a line or an arc segment. Finally, the client may specify some degree of rounding for each vertex (e.g. with a radius if curvature).

Figures 5A, 5B:
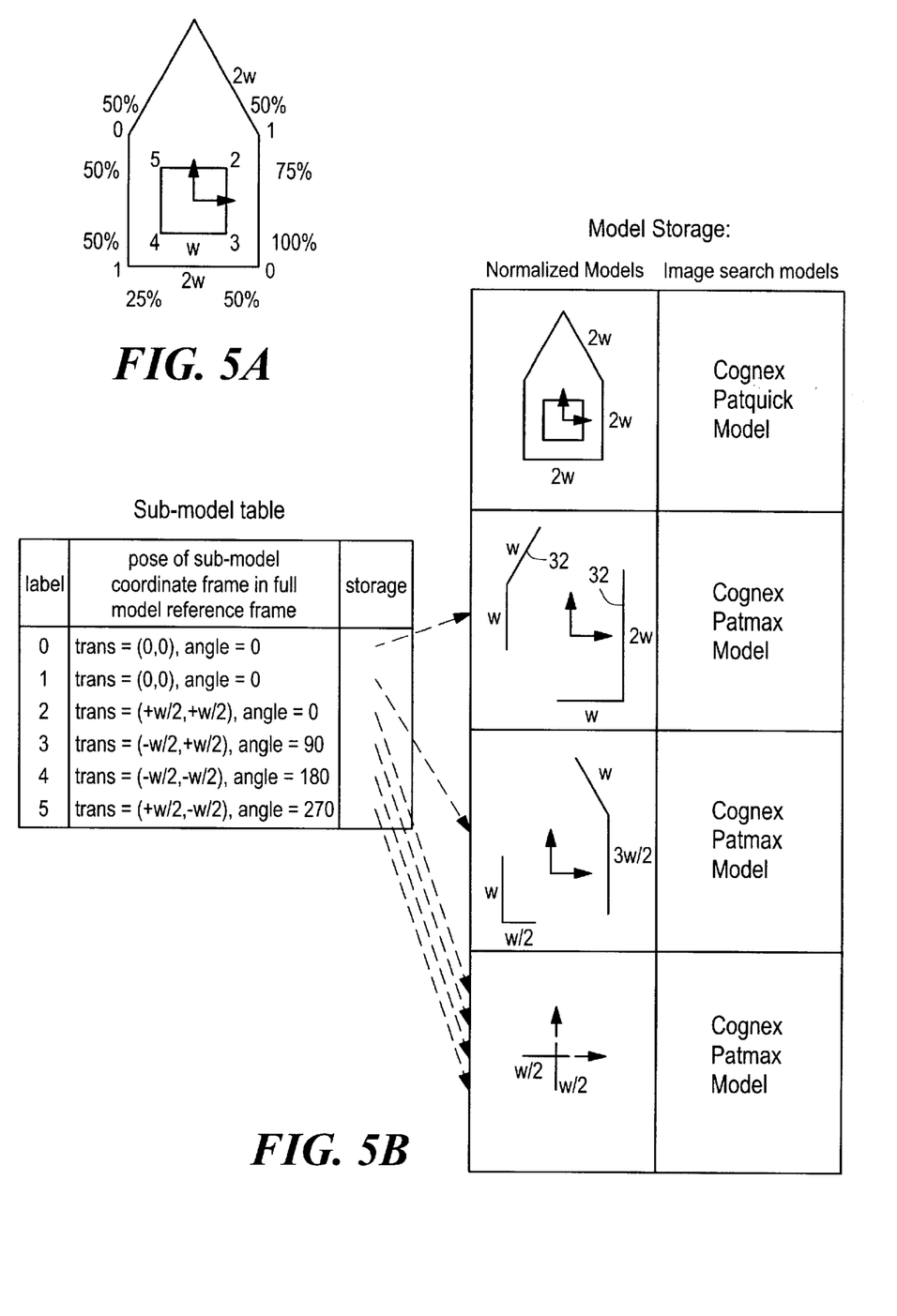
FIG. 5A is a full model of a shape that has been labeled by a client, such as a user (unlabeled vertices have previous and following percentages of 50%)
FIG. 5B is a graphical representation of a sub-model table that has been filled in with the information relating to each of the five sub-models in the full model of FIG. 5A, including a graphical representation of sub-model storage.

Define Decomposition of Full Model into Sub-models 20: The client may optionally provide a specification of how the full model 26 can be broken up into sub-models. This may, for example, be accomplished in the following manner. First, the client explicitly assigns a set of labels (e.g. integer labels) to each vertex in each of the curvilinear shapes within the full model 26, as shown in FIG. 5A. Each label (e.g., 0 and 1) denotes a distinct sub-model, and the act of labeling a vertex causes it to belong to the sub-model corresponding to that label. Typically, each vertex belongs to at most one single sub-model (is labeled at most once), but it is also possible to assign multiple labels to vertices such that they belong to more than one sub-model. Vertices that are not labeled belong to no sub-model.

Figure 3:
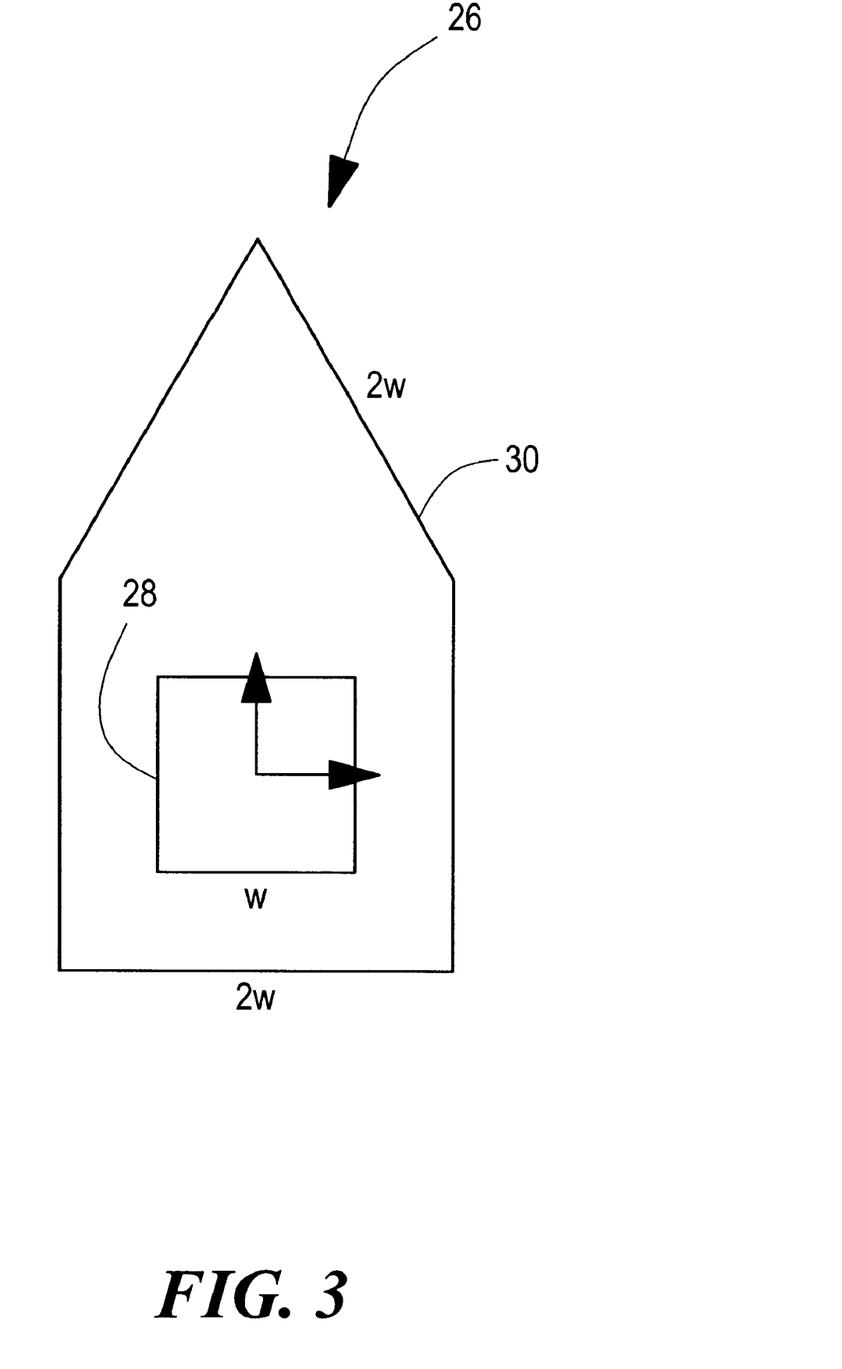
FIG. 3 is a full model of a shape that has not been labeled.

Next, the client must specify the extent the of the full model about each of the labeled vertices that contributes to the sub-models with the corresponding labels. This may be accomplished, for example, by assigning percentages (such as 50%, 75%, and 100%) to each of the two segments connected by that vertex. This assignment is typically accomplished by first specifying an ordering of the two segments in each curvilinear shape in the full model such that each vertex connects a previous and a following segment, and then assigning percentages to the previous and following segments of each labeled vertex, as shown in FIG. 5A, for example. Each labeled vertex that is assigned percentages in this manner defines a "corner" shape 32 consisting of two arc or line segments joined at that vertex, as shown in FIG. 5B, for example. The two segments are simply portions of the segments in the full model 26 that are connected by that vertex. In this manner, each sub-model comprises a spatial arrangement of curvilinear "corner" shapes extracted from the full model about all the vertices with the appropriate label. Note that the corner shapes within each sub-model, as well as the corner shapes between each sub-model, may overlap to an arbitrary extent. Furthermore, the collection of all the corner shapes in all the corner models do not necessarily cover the entire full model (there may be portions of the full model that do not belong to any sub-model). An example of this form of clientspecified sub-model labeling for the full model in FIG. 3 is shown in FIG. 5A.

Figures 4A, 4B:
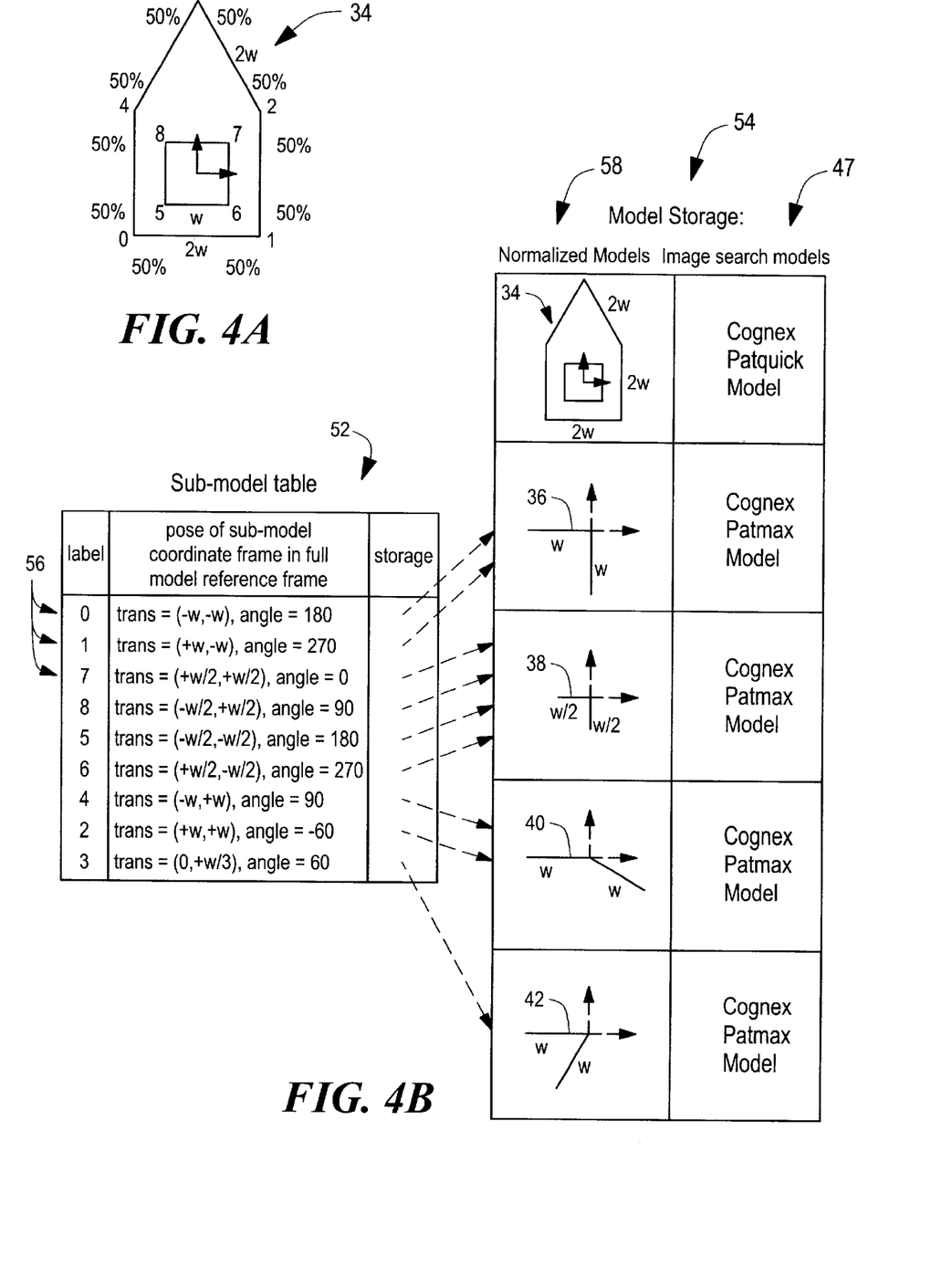
FIG. 4A is a full model of the shape of FIG. 3 that has been labeled automatically, wherein the default decomposition of a model into sub-models was used (unlabeled vertices have previous and following percentages of 50%)
FIG. 4B is a graphical representation of a sub-model table that has been filled in with the information relating to each of the five sub-models in the full model of FIG. 4A, including a graphical representation of sub-model storage.

Alternatively, the client may use some automatic method to specify sub-models, the result of which is as shown in FIGS. 4A and 4B. For example, a unique sub-model label (e.g., 0, 1, 2, 3, 4) might be automatically applied to each vertex in the full model 34, and the percentages applied to the previous and following segments for each vertex might be defaulted to 50%, thereby creating a set of corner sub-models 36, 38, 40, 42, one for each vertex, that do not overlap, but completely cover the entire full model 34. An example of this form of automatic sub-model labeling for the full model in FIG. 3 is shown in FIG. 4A.

Note that the particular strategy for breaking a full model into sub-models is highly dependent on the object and on the conditions under which the object is to be imaged.

Training phase 44: In this phase 44, information about the full model 34, the sub-models 36–42, and a calibration transformation 46 is used to train image search models 47 for both the full model (step 48) and the sub-models (step 50) of the object. An image search model 47 is defined as the collection of all the data needed to find the pose(s) of an object or part of an object in an image using a particular search tool (such as Cognex's Patmax, Patquick, Normalized Correlation, or Generalized Hough Transform (GHT) tools). The trained image search models and other information extracted from the model specification are stored in a sub-model table 52 and in model storage 54, as shown in FIGS. 4B and 5B. The sub-model table 52 contains an entry 56 for each sub-model. Each entry 56 has a label (e.g., 0, 1, 2, 3 . . . ), a pose of the sub-model in the full model reference frame (e.g., trans=(−w,−w), angle=180), and a reference to an entry in model storage (e.g., a pointer to a memory location). The model storage contains an entry for the full model 34 and for each distinct sub-model (e.g., 36, 38, 40, 42). Each entry contains a normalized model description 58 and an image search model 47. Note that the same entry in model storage may be referenced by more than one entry in the sub-model table, thereby saving storage space by allowing sub-models referring to identical sub-models with difference poses in the full model reference frame to share a normalized model and its corresponding image search model. A calibration transformation 46 (in FIG. 1) simply relates the image reference frame to the desired client reference frame having the same units as the defined full model and sub-models. (For example, the full model might be specified in units of microns, and the calibration transformation 46 might relate a client reference frame defined by the physical world, as measured in microns, to the image acquired from a camera. This relationship is often obtained using a calibration vision tool, such as the calibration vision tool provided by the Cognex SMD/PGP line of products). Note that a calibration transformation may be the identity transformation (client reference frame=image reference frame). This phase usually only needs to be performed each time the calibration transformation 46 changes significantly, or when the full model 22 or sub-model 24 specifications change.

Figure 2:
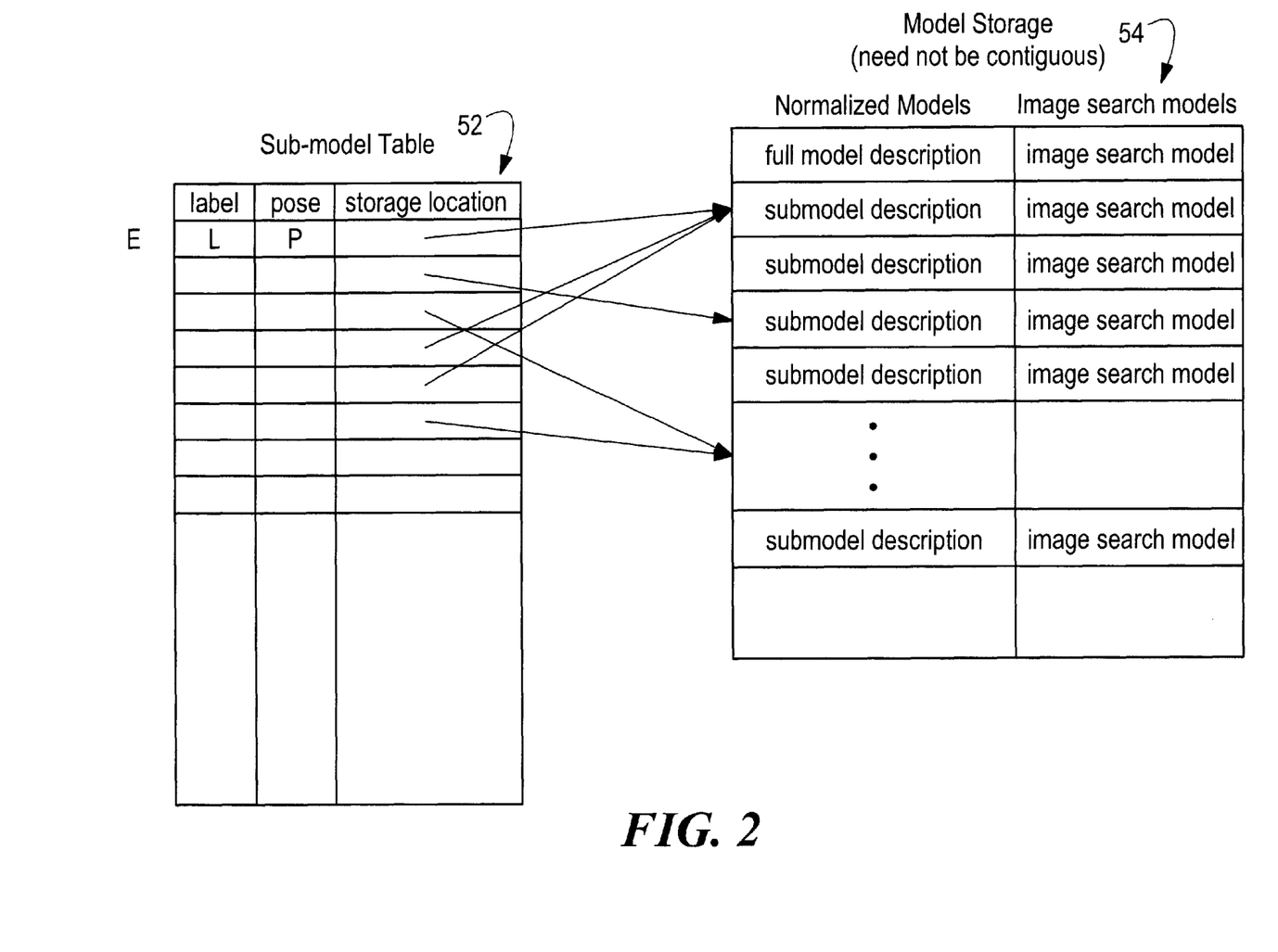
FIG. 2 is a graphical representation of the general form of a sub-model table having slots for sub-model label, pose, and storage location for each sub-model.

Extract Normalized Sub-Models and their Poses 50 . . . The defined sub-model decomposition 24 is used to extract the sub-models from the full model, normalize them, determine the poses of the normalized sub-models within the full model reference frame, and train image search models for each normalized sub-model. For example, referring to FIG. 2, the following method may be used to extract a particular sub-model with label L (this method would be performed for each label L in the sub-model decomposition):

1. Create a new entry E in the sub-model table. Record the label L in this entry under "label".
2. Create an empty sub-model SM.
3. For each vertex V with label L in the full model, perform the following steps:
   3a. Create a curvilinear "corner" shape CS consisting of two segments. The first segment is that contiguous portion of the segment previous to vertex V and closest to vertex V in the full model that has length equal to the client-specified previous percentage for vertex V. The second segment is that contiguous portion of the segment following vertex V and closest to vertex V that has length equal to the client-specified following percentage for vertex V. This corner shape may, for example, be represented in the same manner that curvilinear shapes within the full model are represented (using vertices, and segments).
   3b. Copy the corner rounding specification, if any, from the vertex V to the vertex in the corner shape CS between the first and second segments.
   3c. Add the corner shape CS to the sub-model SM.
4. Determine the pose P of sub-model SM in the full model. For example, if there is more than one corner shape within the sub-model SM, one may let the rigid pose P be the identity rigid transformation. Otherwise, one can find and record the pose measured in the full model reference frame of the sub-model labeled L as follows:
   4a. Extract the corner shape, CS, from SM.
   4b. Extract the first and second segments S1 and S2 in corner shape CS, respectively.
   4c. Extract the common end point v1 of segments S1 and S2, and the other endpoint v2 of segment S2.
   4d. Measure the angle A defined in full model space by the vector from v2 to v1.
   4e. Let the rigid pose P of the normalized sub-model SM' be defined by v1, and the angle be defined by A.
5. Record P into entry E of the sub-model description table under "pose".
6. Create a new normalized version SM' of sub-model SM by transforming all vertices and segments in each corner shape in SM by the inverse of (rigid transform) P. (Herein, normalization of a sub-model is defined as transforming the sub-model in the reference frame of the full model into the reference frame of the sub-model, thereby removing the pose components of the sub-model in the full model so that the shapes of a plurality of sub-models can be compared.)
7. Compare SM' to each sub-model SM" (under "normalized sub-models") in each entry SE of model storage. If a sub-model SM" in storage is nearly identical to sub-model SM', record the storage location of the entry SE in model storage containing SM" under "storage" in entry E of the sub-model table. Otherwise, perform the following steps:
   7a. Create a new entry SE in model storage.
   7b. Record the storage location of the new entry SE under "storage" in entry E of the sub-model table.
   7c. Store the normalized sub-model SM' under "normalized sub-models" in entry SE in model storage.
   7d. Train an image search model IM using the normalized sub-model SM'. The particular search model trained for each sub-model is typically a Cognex Patquick search model, but other models are also possible (e.g. image search models for Cognex's Patmax, Normalized Correlation, or GHT tools). To create the image search model it may, for example, be necessary to project the sub-model SM' into a training image using the supplied calibration transformation, and then use the image training method provided by the tool. Even better training performance can often be achieved if fully enclosed regions of the sub-model when projected into the training image are flood filled with a distinctive gray level. Optionally, it may be advisable to mask out those portions of the training image to which rounded corners in the sub-model project, since corners are in general difficult to match later when the corresponding search tool is applied in order to find the trained image search model in another image. This option is specified by the client.
   7e. Store the new image search model IM under "image search model" in entry SE of model storage.

Create Image Search Model For Full Model of Object 48: A full image search model 52 is created for the full model of the object in manner similar to the way in which image search models are created for normalized sub-models (see step 7d above). The full image search model 52 trained for the full model is typically a Cognex Patmax model, but other full image search models are also possible (e.g. image search models for Cognex's Patquick, Normalized Correlation, or GHT tools). This image search model is placed in a separate entry in model storage 54.

Examples of the resulting sub-model table 52 and model storage 54 contents created by the training phase for the automatic and client-specified model decompositions given in 4A and 5A, respectively, are shown in 4B and 5B, respectively.

CPL (Coarse Part Location) phase 14: In this phase 14, a set 54 of approximate poses of the full model within the image are generated. This phase 14 needs to be performed each time the full model, sub-model decomposition, calibration transformation, or image changes significantly.

Coarse Find Entire Object with Full Image Search Model 56: The search model generated for the full model of the object is used by the corresponding search tool (e.g. Cognex's Patmax, Patquick, Normalized Correlation, or GHT tool) to find the possible approximate poses of the full model within the image. The calibration transformation 46 is then used to transform these poses into the client reference frame. The search tool will only search for the full model in the image within the specified uncertainty ranges for each DOF (degrees of freedom, typically location, angle, scale, aspect, and skew ranges). Smaller ranges usually yield faster but less robust searches. Note that various techniques, such as sub-sampling, may be used to speed up the search process at the expense of accuracy since only a coarse pose of the full model is necessary at this stage. This step 56 generally also yields various statistics 58 for each of the found full model poses. For example, use of the Cognex Patquick tool may provide a score indicating how well the model matches what has been found in the image.

FPL (Fine Part Location) phase 16: In this phase 16, a set 62 of very accurate poses of the full model within the image are generated. This phase 60 needs to be performed each time the full model, sub-model decomposition, calibration transformation, image, or CPL phase output has changed significantly. Note, however, that this phase 16 does not require running the CPL phase 14 if the coarse poses 54 of the full model in the client reference frame are somehow already known. The following steps are performed once for each candidate full model pose in the client reference frame.

Determine Coarse Pose of Each Sub-Model in Client Reference Frame 64: The coarse pose of each sub-model in the client reference frame 66 is first determined. This 64 is easily performed for a particular sub-model by composing a pose 54 of the full model in client coordinates with the pose 68 of the sub-model in full model coordinates provided by the appropriate entry in the sub-model table.

Locally and Independently Find Fine Pose of Sub-Models in Client Reference Frame 70: For each sub-model in the sub-model table, the "storage" reference is used to access the entry in model storage containing the appropriate image search model. Then, the corresponding search tool (e.g. Cognex's Patmax, Patquick, Normalized Correlation, or GHT tool) is used to find the accurate pose 72 of the sub-model within the image. The calibration transformation 46 is then used to transform these poses into the client reference frame 62. The search tool will only search for each sub-model in the image within the specified uncertainty ranges for each sub-model DOF 73 (typically location and angle ranges), which are assumed to be centered about the coarse sub-model pose (in the image). These uncertainty ranges 73 are typically a function of the expected accuracy of the CPL phase in each dimension, in addition to the maximum allowable deformation in the sub-model arrangement defined by the full model decomposition. Note that not all sub-models are necessarily found in the image. For those that are, this step will generally yield various statistics 75 for each of the found sub-model poses. For example, the use of the Cognex Patmax tool may provide one or more scores indicating how well the sub-model matches what has been found in the image.

Fit Sub-model Poses . . . 74: The found sub-model poses in the client reference frame are (trivially) corresponded to the sub-model poses stored in the entry of the sub-model table with the appropriate label. Then, the pose of the full model within the client reference frame is computed such that the expected sub-model poses in the client reference frame, determined by composing the expected (CPL) full model pose in the client reference frame with the sub-model pose in the full model reference frame, best match the found sub-model poses in the client reference frame. For example, this may be accomplished by minimizing the sum squared distances between the found sub-model locations (points) in client space and the locations of the corresponding sub-models in the full model when projected into client space via the model-to-client pose (a least squares approach). Additionally, the DOFs (x, y, angle, scale, etc.) that are allowed to vary in the model-to-client pose may be constrained by the client.

The following procedure may, for example, be used to perform a least squares fit:

1. Let the point pk be the origin of the kth sub-model as measured in the full model reference frame (the translation component of the pose of the sub-model in the model reference frame).
2. Let the point p'k be the (corresponding) origin of the kth sub-model as measured in the client reference frame (the translation component of the pose of the sub-model in the client reference frame).
3. The pose of the full model in the client reference frame, which we are trying to find, can be denoted by a linear transform F. Note that the exact form of F depends on how many DOFs are allowed to vary in the pose (e.g. translation, orientation, scale, aspect, and skew).
4. Let the mapping of a point p' measured in the client reference frame to the full model reference frame be given by Fp'.
5. Find the transform F that minimizes the sum over all k (over all sub-models) of |Fp'k−pk|^2. Depending on the form of F, there may or may not be a closed form solution to this minimization. Otherwise, an iterative numerical solution can be determined. Both solutions are known in the art.

Another less accurate technique would be to align the moments (center of mass and 1st moments of inertia) of the sub-model spatial arrangements in full model space with those computed for the found spatial arrangements in client space. Several alternative fit strategies can be used and are generally known in the art. Regardless of the technique, this step will generally yield various statistics. For example, a least squares fit may provide the sub-squared error for the final pose.

Other modifications and implementations will occur to those skilled in the art without departing from the spirit and the scope of the invention as claimed. Accordingly, the above description is not intended to limit the invention except as indicated in the following claims.

What is claimed is:

1. A method of locating an object within a client region, the object having a plurality of portions, the method comprising:
   defining a full geometric model of the object;
   defining a plurality of geometric sub-models of the object;
   determining coarse candidate poses of the object within the region using an image of the region and the full geometric model of the object;
   determining the fine pose of each of a plurality of portions of the object using the coarse candidate poses of the object within the region, and at least some of said geometric sub-models, to provide a plurality of object portion fine poses within the region;

determining the fine poses of the object within the region using said plurality of object portion fine poses.

2. The method of claim 1, wherein defining a plurality of sub-models of the object includes defining the pose of each sub-model within the reference frame of the full model.

3. The method of claim 1, wherein determining the fine pose of each of a plurality of portions of the object includes:

determining the coarse poses of each of a plurality of portions of the object, and using each coarse pose, determining the fine pose of each of the plurality of portions of the object.

4. The method of claim 3, wherein determining the fine pose of each of a plurality of portions of the object occurs locally and independently for each portion of the object.

5. The method of claim 1, wherein using a full geometric model of the object to determine the coarse candidate poses of the object includes creating an image search model in an image frame of reference.

6. The method of claim 5, wherein creating an image search model in an image frame of reference includes creating a template matching model of the object.

7. The method of claim 5, wherein creating an image search model in an image frame of reference includes creating a normalized correlation search model of the object.

8. The method of claim 5, wherein creating an image search model in an image frame of reference includes creating a generalized Hough transform model of the object.

9. The method of claim 1, wherein using a geometric sub-model to determine the fine pose of a portion of the object includes:

creating an image search model in an image frame of reference for that sub-model.

* * * * *